United States Patent
Dayal et al.

(10) Patent No.: US 8,605,729 B2
(45) Date of Patent: Dec. 10, 2013

(54) METHOD AND APPARATUS FOR OIS PROTECTION IN A WIRELESS COMMUNICATION SYSTEM

(75) Inventors: Pranav Dayal, San Diego, CA (US); Tamer A. Kadous, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

(21) Appl. No.: 12/615,711

(22) Filed: Nov. 10, 2009

(65) Prior Publication Data

US 2011/0007696 A1    Jan. 13, 2011

Related U.S. Application Data

(60) Provisional application No. 61/224,319, filed on Jul. 9, 2009, provisional application No. 61/243,619, filed on Sep. 18, 2009.

(51) Int. Cl.
*H04L 12/56* (2006.01)
*H04B 7/00* (2006.01)

(52) U.S. Cl.
USPC .................. 370/395.42; 370/468; 455/512

(58) Field of Classification Search
USPC ......... 370/203, 208, 210, 321, 341, 390, 432, 370/329, 342, 395.4, 395.41, 395.42, 370/395.43, 431, 437, 468; 455/436, 552.1, 455/166.2, 435.3, 512
See application file for complete search history.

(56) References Cited

U.S. PATENT DOCUMENTS

| | | | |
|---|---|---|---|
| 7,978,623 B1 * | 7/2011 | Kotecha | 370/252 |
| 2006/0013176 A1 | 1/2006 | De Vos et al. | |

(Continued)

FOREIGN PATENT DOCUMENTS

| | | |
|---|---|---|
| EP | 1235402 A2 | 8/2002 |
| EP | 2214414 A1 | 8/2010 |

OTHER PUBLICATIONS

DVB Organization: "cm0950R1 NGH_Study_Mission_Final_Report.pdf", Jun. 10, 2008, DVB, Digital Video Broadcasting, C/0 EBU—17A Ancienne Route—CH-1218 Grand Saconnex, Geneva-Switzerland, XP017825847, 5.3.1.3 Superframe structure 5.5.2 Technology overview 7. Possible Approaches/Enhancements/Changes for NGH 7.2.1.6 Overhead 7.2.1.6.2 Protocol overhead 7.2.1.6.3 Signalling overhead.

(Continued)

*Primary Examiner* — Habte Mered
(74) *Attorney, Agent, or Firm* — Rupit M. Patel

(57) ABSTRACT

Systems and methodologies are described herein that facilitate improved multi-radio coexistence between a Forward Link Only (FLO) radio and at least one non-FLO radio associated with a wireless device. As described herein, Overhead Information Symbol (OIS) transmissions scheduled by a FLO radio (such as transmissions on a dedicated OIS control channel or data transmissions containing embedded OIS information) can be given higher priority than other transmissions that collide with the OIS transmissions. In addition, transmissions scheduled by a non-FLO radio can be prioritized above respective non-OIS transmissions scheduled by a FLO radio, or alternatively non-OIS FLO transmissions can additionally be prioritized above transmissions scheduled by a non-FLO radio according to a measured amount of degradation present at the non-FLO radio. In a specific example described herein involving a Long Term Evolution (LTE) radio, degradation can be determined based on a number of successively missed Physical Uplink Control Channel (PUCCH) transmissions.

46 Claims, 12 Drawing Sheets

(56) References Cited

U.S. PATENT DOCUMENTS

| | | |
|---|---|---|
| 2006/0184961 A1 | 8/2006 | Lee et al. |
| 2007/0291709 A1* | 12/2007 | Wassingbo et al. ........... 370/338 |
| 2008/0020768 A1 | 1/2008 | Li et al. |
| 2008/0186891 A1* | 8/2008 | Aue .............................. 370/311 |
| 2008/0233875 A1 | 9/2008 | Desai et al. |
| 2008/0259855 A1* | 10/2008 | Yoon et al. ................... 370/329 |
| 2008/0318630 A1 | 12/2008 | Gil |
| 2009/0040937 A1 | 2/2009 | Xhafa et al. |
| 2009/0163145 A1 | 6/2009 | Xhafa et al. |
| 2009/0180451 A1 | 7/2009 | Alpert et al. |
| 2009/0247071 A1* | 10/2009 | Xhafa et al. ................. 455/11.1 |
| 2009/0268656 A1* | 10/2009 | Yousef ......................... 370/315 |
| 2010/0287599 A1 | 11/2010 | He et al. |
| 2011/0039495 A1 | 2/2011 | Sawai et al. |
| 2012/0213150 A1 | 8/2012 | Oguz et al. |

OTHER PUBLICATIONS

International Search Report and Written Opinion—PCT/US2010/041614, International Search Authority—European Patent Office—Oct. 29, 2010.

Zhu et al., "Multi-Radio Coexistence: Challenges and Opportunites," Computer Communications and Networks, 2007. ICCCN 2007. Proceedings of 16th International Conference on Computer Communications and Networks, pp. 358-364, Aug. 13-16, 2007, See Part IV.

Taiwan Search Report—TW099122724—TIPO—Apr. 11, 2013.

* cited by examiner

| | FLO | LTE |
|---|---|---|
| Bin 1 | All events | |
| Bin 2 | | All events |

Option 1: LTE always wins

| | FLO | LTE |
|---|---|---|
| Bin 1 | All other events | |
| Bin 2 | | All events |
| Bin 3 | TDM2OIS | |

Option 2: FLO wins if TDM2OIS, else LTE wins

| | FLO | LTE |
|---|---|---|
| Bin 1 | | All events |
| Bin 2 | All events | |

Option 3: FLO always wins

| | FLO | LTE |
|---|---|---|
| Bin 1 | | PUCCH (if less than two previous PUCCH transmissions have been blocked) |
| Bin 2 | All other events | |
| Bin 3 | | PUCCH (if two previous PUCCH transmissions have been blocked) |
| Bin 4 | TDM2OIS | |

METHOD AND APPARATUS FOR OIS PROTECTION IN A WIRELESS COMMUNICATION SYSTEM

CROSS-REFERENCE

This application claims the benefit of U.S. Provisional Application Ser. No. 61/224,319, filed Jul. 9, 2009, and entitled "METHOD AND APPARATUS FOR LTE AND FLO COEXISTENCE BASED ON OIS PROTECTION," and 61/243,619, filed Sep. 18, 2009, and entitled "METHOD AND APPARATUS FOR OIS PROTECTION IN A WIRELESS COMMUNICATION SYSTEM," the entirety of which is incorporated herein by reference.

BACKGROUND

I. Field

The present disclosure relates generally to wireless communications, and more specifically to managing coexistence between multiple radios utilized within a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. In order to manage communication via multiple radios and avoid collisions and/or interference between respective radios, a coexistence manager (CxM) and/or other means can be utilized to arbitrate between respective radios that are in collision (e.g., radios configured such that their mutual operation would cause significant interference on at least one of the radios). To the furtherance of at least the above ends, it would be desirable to implement techniques for managing radio coexistence such that transmissions of Overhead Information Symbol (OIS) information and/or other information associated with a Forward Link Only (FLO) radio are protected from substantial radio degradation.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a first radio operating according to Forward Link Only (FLO) and at least one second radio not operating according to FLO; identifying a transmission of Overhead Information Symbol (OIS) information scheduled to occur at a given time interval via the first radio; and prioritizing the transmission of OIS information such that the transmission of OIS information is given a higher priority level than respective events associated with the at least one second radio.

A second aspect described herein relates to a wireless communications apparatus, which can comprise a memory that stores data relating to a first radio operating according to FLO, at least one second radio not operating according to FLO, and a transmission of OIS information scheduled by the first radio. The wireless communications apparatus can further comprise a processor configured to prioritize the transmission of OIS information such that the transmission of OIS information is given a higher priority level than respective events associated with the at least one second radio.

A third aspect relates to an apparatus, which can comprise means for identifying a FLO radio and at least one non-FLO radio; means for obtaining information relating to an OIS transmission scheduled by the FLO radio; and means for prioritizing the OIS transmission over respective transmissions scheduled by the at least one non-FLO radio.

A fourth aspect described herein relates to a computer program product, which can include a computer-readable medium that comprises code for causing a computer to identify a first radio operating according to FLO and at least one second radio not operating according to FLO; code for causing a computer to identify a transmission of OIS information scheduled by the first radio; and code for causing a computer to prioritize the transmission of OIS information such that the transmission of OIS information is given a higher priority level than respective events associated with the at least one second radio.

A fifth aspect described herein relates to an integrated circuit operable to execute a set of machine-executable instructions. The set of machine-executable instructions can comprise identifying a FLO radio and at least one non-FLO radio; obtaining information relating to an OIS transmission scheduled by the FLO radio; and prioritizing the OIS transmission over respective transmissions scheduled by the at least one non-FLO radio.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
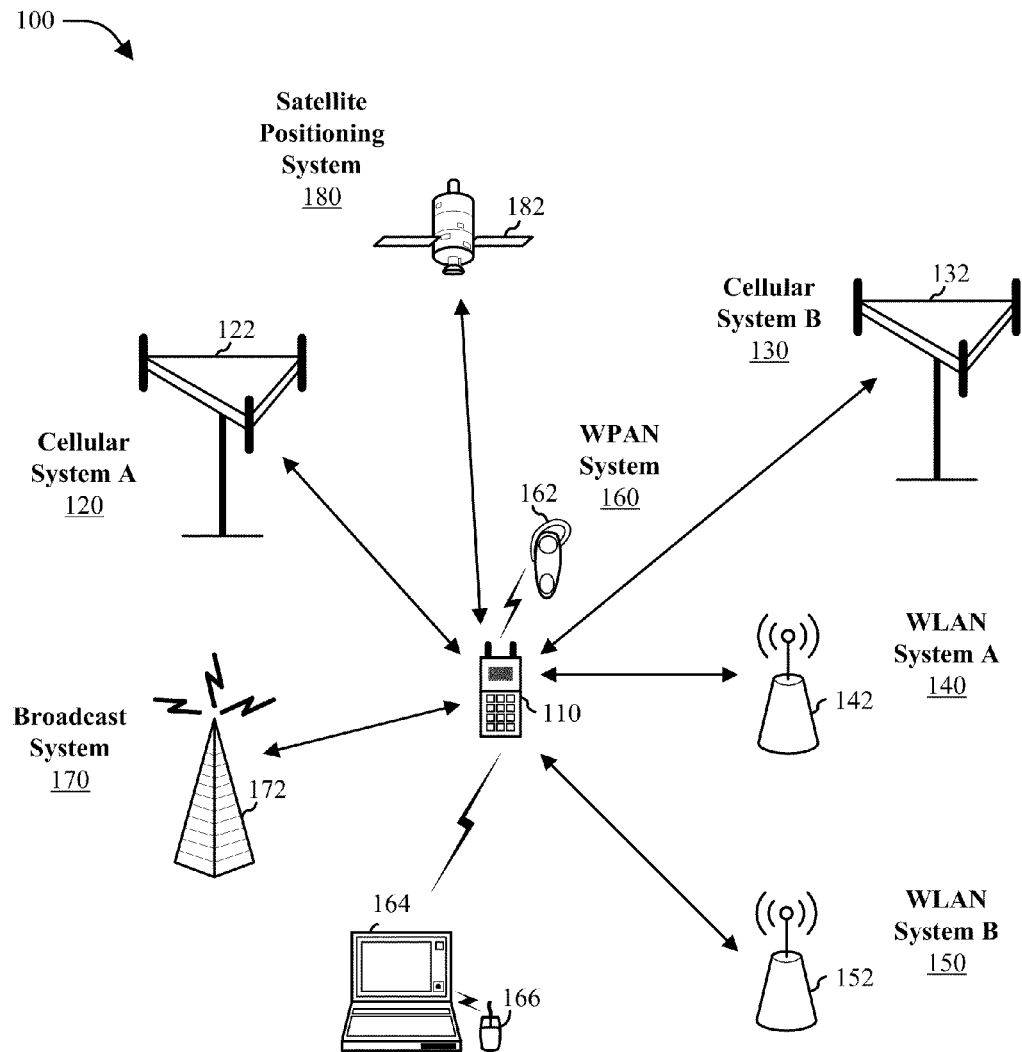
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof. If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as Bluetooth, IEEE 802.15, etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
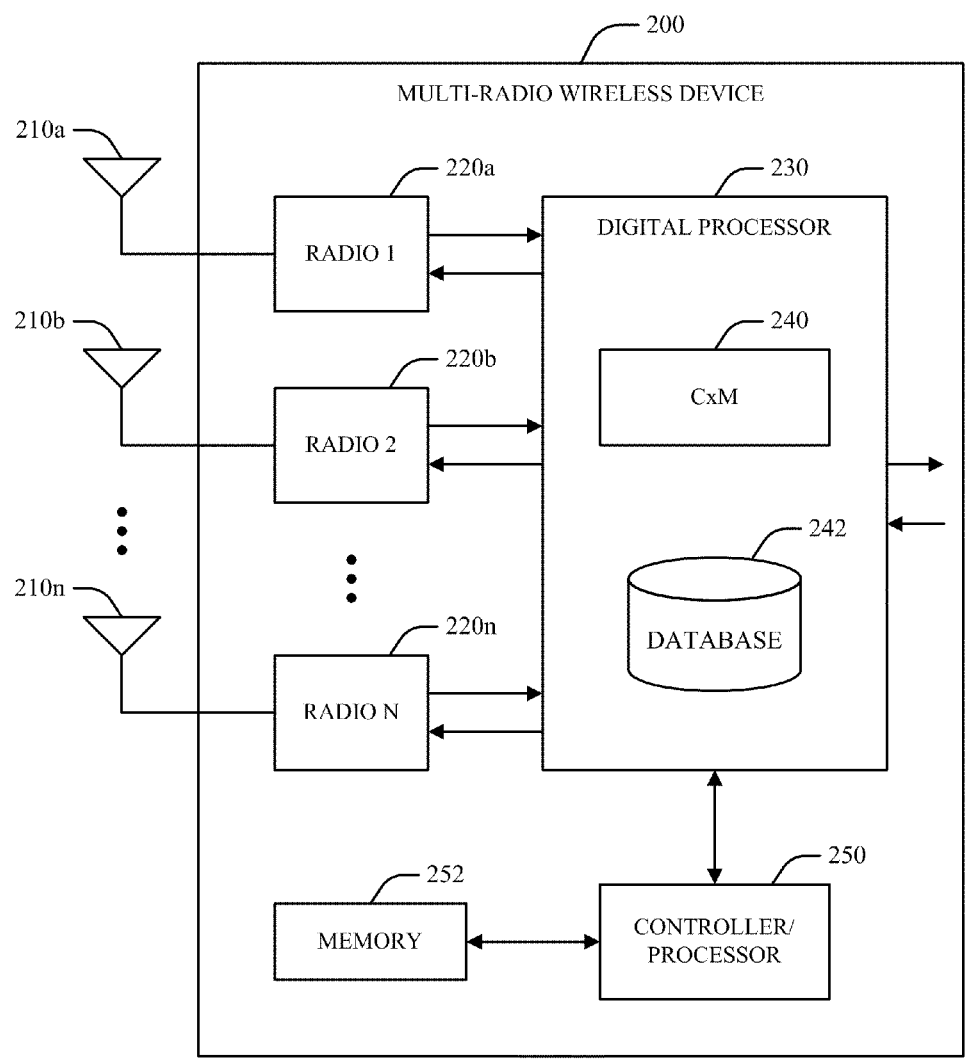
FIG. 2 is a block diagram of an example wireless device that can be operable to manage coexistence between respective radios in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver; or the like. In one example, digital processor 230 can include a coexistence manager (CxM) 240 that can control the operation of radios 220 in order to improve the performance of wireless device 200 as generally described herein. CxM 240 can have access to a database 242, which can store information used to control the operation of radios 220.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

Figure 3:
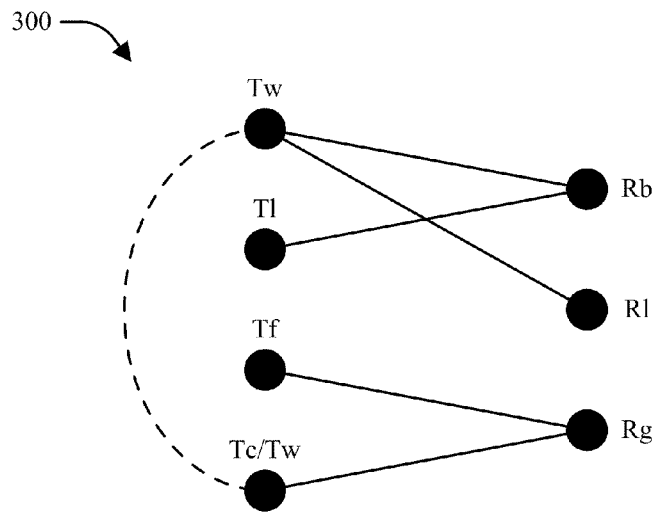
FIG. 3 illustrates an example set of radios that can be implemented in a wireless communication environment and respective potential collisions that can occur among the example set of radios.

In accordance with one aspect, CxM 240 can be utilized to manage operation of respective radios 220 utilized by wireless device 200 in order to avoid interference and/or other performance degradation associated with collisions between respective radios 220. By way of further illustration, graph 300 in FIG. 3 represents respective potential collisions between seven example radios in a given decision period. In the example shown in graph 300, the seven radios include a WLAN transmitter (Tw), an LTE transmitter (Tl), an FM transmitter (Tf), a GSM/WCDMA transmitter (Tc), an LTE receiver (Rl), a Bluetooth receiver (Rb), and a GPS receiver (Rg). The four transmitters are represented by four nodes on the left side of graph 300, and the three receivers are represented by three nodes on the right side of graph 300. A potential collision between a transmitter and a receiver is represented on graph 300 by a branch connecting the node for the transmitter and the node for the receiver. Accordingly, in the example shown in graph 300, collisions may exist between (1) a WLAN transmitter (Tw) and a Bluetooth receiver (Rb); (2) a LTE transmitter (Tl) and a Bluetooth receiver (Rb); (3) a WLAN transmitter (Tw) and a LTE receiver (Rl); (4) a FM transmitter (Tf) and a GPS receiver (Rg); and (5) a WLAN transmitter (Tw), a GSM/WCDMA transmitter (Tc), and a GPS receiver (Rg).

In accordance with another aspect, CxM 240 can utilize one or more techniques as described herein for managing coexistence between a Forward Link Only (FLO) radio and disparate radio technologies utilized by wireless device 200. Such techniques can provide, for example, a tradeoff between always favoring one radio technology over other technologies.

Figure 4:
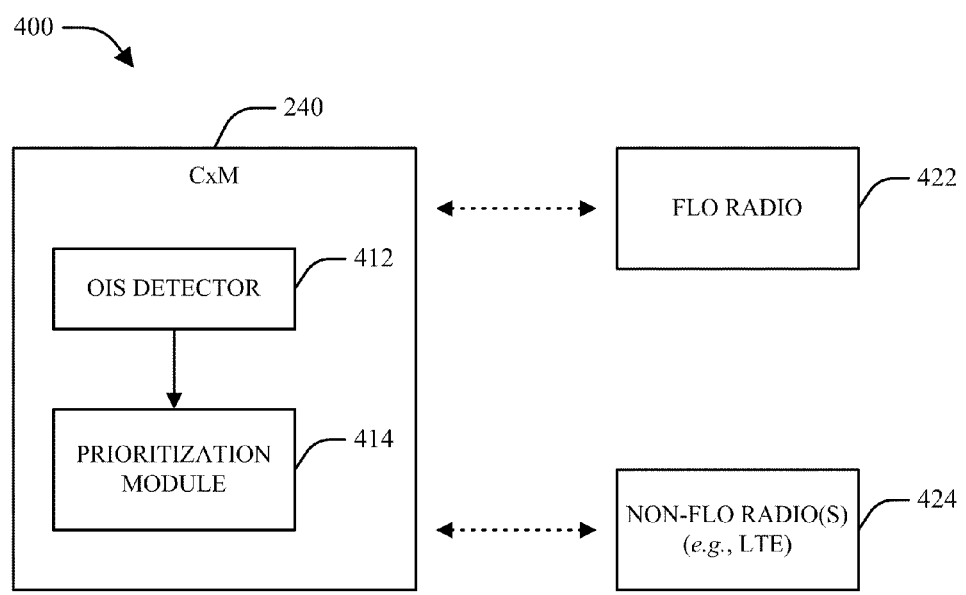
FIG. 4 is a block diagram of a system for protecting integrity of Overhead Information Symbol (OIS) transmissions in accordance with various aspects.

In one example, CxM 240 can operate as shown in system 400 illustrated by FIG. 4 to manage coexistence between a FLO radio 422 and at least one non-FLO radio 424. It should be appreciated that non-FLO radio(s) 424 can utilize any suitable radio technology, such as LTE, Bluetooth, GPS, FM broadcast, and/or any other suitable technology or combination of technologies (e.g., as illustrated by FIG. 1 or otherwise). While various examples described herein relate to techniques for managing LTE as a non-FLO radio 424, it should be appreciated that such examples are provided for illustration rather than limitation, and that such examples are not intended to limit the scope of the claimed subject matter in any way unless explicitly stated otherwise in the hereto appended claims.

In accordance with one aspect, CxM 240 can utilize various coexistence solutions as described herein between a FLO radio 422 and one or more non-FLO radios 424, effectively providing a tradeoff between always favoring one radio over the other. For example, CxM 240 can utilize an Overhead Information Symbol (OIS) detector 412, a prioritization module 414, and/or other suitable mechanisms to allow a non-FLO radio 424 to transmit unless such transmission would overlap in time with an OIS control channel of FLO radio 422 and is at a high enough power to cause the signal-plus-interference-to-noise ratio (SINR) and/or other performance requirement for the OIS to not be met.

By way example, when a FLO radio 422 and a non-FLO radio 424 (e.g., LTE) are implemented on the same terminal in adjacent bands, transmissions from non-FLO radio 424 can cause significant interference to FLO radio 422. Further, an associated device may in some cases impose a restriction that only one of the technologies operates at a given time, which can lead to significant user experience degradation. Accordingly, CxM 240 can implement techniques to allow both technologies to operate simultaneously in order to facilitate acceptable performance for both.

In order to achieve associated device performance as described above, CxM 240 can be configured such that a non-FLO radio 424 is allowed to transmit if the resulting SINR for FLO radio 422 will still be above target. Otherwise, CxM 240 can be configured to check, via an OIS detector 412 and/or other suitable means, if FLO radio 422 is transmitting OIS. If FLO radio 422 is transmitting OIS, non-FLO radio(s) 424 can be forced to stop transmitting (e.g., by prioritization module 414). Otherwise, the non-FLO radio(s) 424 can be allowed to go through. By utilizing an OIS detector 412 and prioritization module 414 in this manner, it can be appreciated that CxM 240 can allow acceptable performance for both FLO and non-FLO radios simultaneously, thereby avoiding performance penalties associated with a first radio technology in the event that a second radio technology is always allowed to go through.

Figure 5:
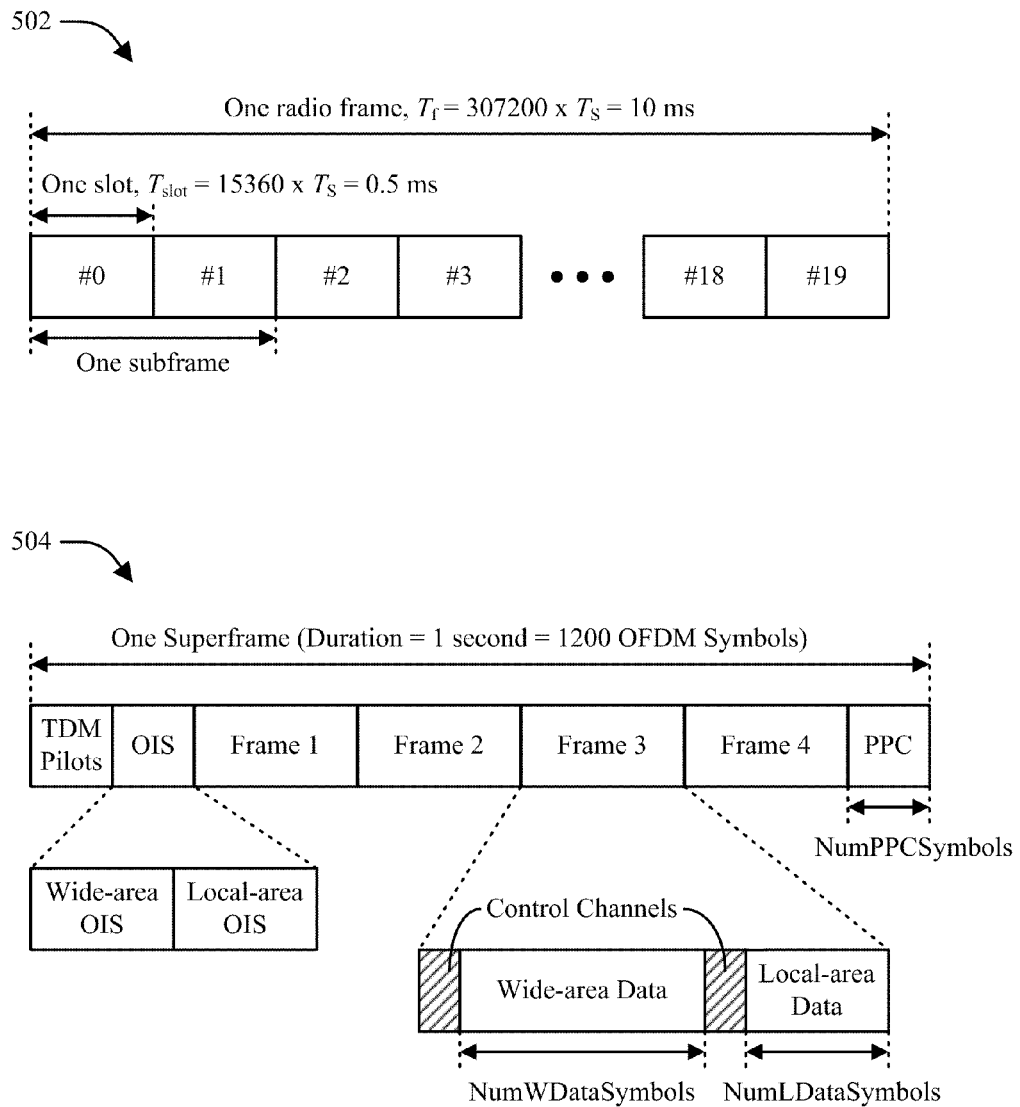
FIG. 5 illustrates example radio frame structures that can be utilized by respective radio technologies and managed in accordance with various aspects.

Turning next to FIG. 5, respective diagrams 502-504 are provided that illustrate respective frame structures that can be utilized within a wireless communication environment. More particularly, diagram 502 illustrates an example LTE uplink (UL) radio frame, while diagram 504 illustrates an example FLO superframe. It should be appreciated, however, that diagrams 502-504 are provided merely by way of example and that any radio technologies or radio technology combinations could be managed as described herein. With respect first to diagram 502, an LTE UL radio frame can be comprises of multiple (e.g., 10) subframes, each of which can be further divided into respective (e.g., 2) slots.

Further, as shown in diagram 504, a FLO superframe can be one second in duration and/or any other suitable duration and can be divided into various control segments and a series of frames (e.g., 4 frames). Each frame can include, for example, a data channel (e.g., a Multicast Logical Channel or MLC) that carries information for a particular media channel. In addition, a FLO superframe as illustrated by diagram 504 can include an OIS channel, which can contain the location of respective MLCs in the superframe. In one example, the location of each MLC can be configured to vary on a per-superframe basis, such that decoding of OIS information corresponding to each superframe is required for continued reception of data.

In another example, respective MLCs in a FLO superframe can themselves be configured to contain an embedded OIS that carries OIS information corresponding to the next superframe. Accordingly, if a FLO terminal successfully decodes an embedded OIS, it may in some cases not be required to rely on the OIS of the next superframe to decode the MLC in the next superframe. In contrast, it can be appreciated that if the embedded OIS is not decoded correctly, the terminal may then instead be required to decode the OIS in the next superframe; otherwise, data transmitted in the following superframe can in some cases be lost.

In view of at least the above-described potential for data loss in the case of missed OIS information, CxM 240 in FIG. 4 can be configured such that the OIS channel on FLO radio 422 is protected from degradation in SINR due to interference from other radios 424. For example, CxM 240 can be configured to receive event reports from various radios in a given decision unit (DU), based on which CxM 240 can conduct respective determinations regarding which radios to allow in that DU. More particularly, CxM 240 can protect OIS information associated with FLO radio 422 by detecting (e.g., via OIS detector 412) respective transmit events from non-FLO radio(s) 424 that overlap with OIS information corresponding to FLO radio 422 (e.g., corresponding to an OIS control channel and/or embedded OIS information). Upon detecting such events, prioritization module 414 and/or other mechanisms associated with CxM 240 can be utilized to determine whether the power of the transmit events are such that they will cause the OIS to miss its target SINR. For events for which a positive determination is reached, CxM 240 can grant the OIS and disallow (e.g., via a negative acknowledgement or NACK) the determined events.

Figure 6:
FIG. 6 illustrates an example priority structure that can be utilized for managing coexistence between example radios in accordance with various aspects.

Various aspects of the above-described CxM configuration for the specific, non-limiting case of FLO/LTE coexistence management are illustrated in further detail by diagram 600 in FIG. 6. As diagram 600 illustrates, if coexistence between LTE and FLO is determined not to be possible, various options can be utilized to prioritize events associated with the respective radios. For instance, Option 1 illustrated in diagram 600 shows that LTE can be configured to win conflicts with FLO in all cases, such that all LTE events are prioritized more highly than FLO events. Alternatively, Option 3 illustrated in diagram 600 shows that FLO can be configured to always win conflicts as against LTE, such that all FLO events are prioritized over LTE events. However, to facilitate a tradeoff between LTE performance and FLO performance, Option 2 as illustrated in diagram 600 can be utilized in accordance with various aspects described above, wherein OIS events associated with FLO (e.g., TDM2OIS events) are prioritized ahead of all LTE events, which are in turn prioritized ahead of all other FLO events. While diagram 600 illustrates an implementation wherein LTE events are prioritized ahead of all non-OIS FLO events, it should be appreciated that priority interleaving between FLO and LTE can occur in any suitable manner. For example, various alternative priority structures that can be utilized in managing coexistence between LTE and FLO radios are illustrated in further detail herein.

Figures 7, 8:
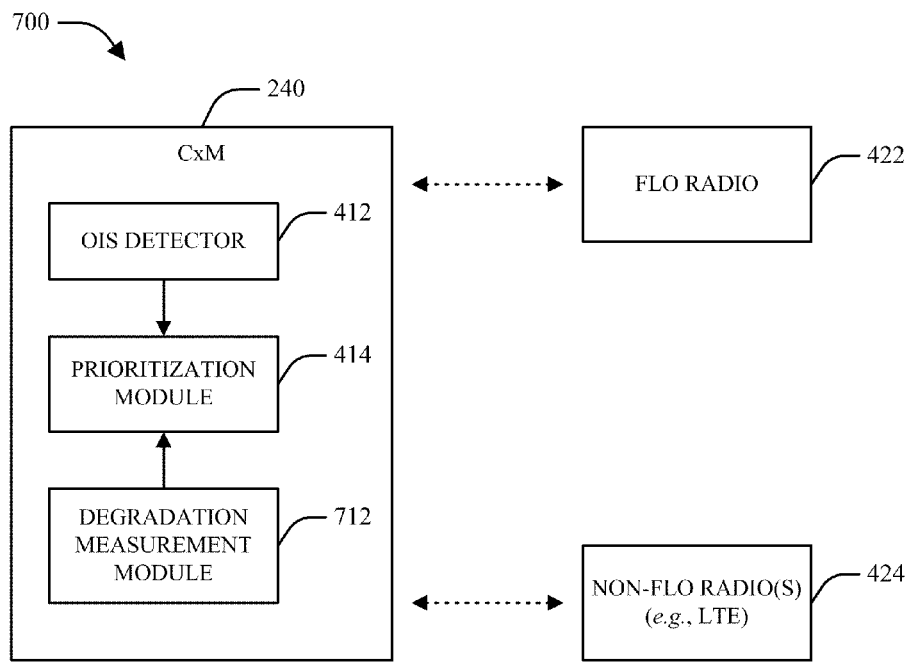
FIG. 7 is a block diagram of a system for managing coexistence between a Forward Link Only (FLO) radio and at least one disparate radio in accordance with various aspects.
FIG. 8 illustrates another example priority structure that can be utilized for managing coexistence between example radios in accordance with various aspects.

Turning next to FIG. 7, a block diagram of another system 700 for managing coexistence between a FLO radio 422 and one or more non-FLO radios 424 (e.g., LTE and/or any other suitable radio(s)) is illustrated. As illustrated by system 700, a CxM 240 can utilize an OIS detector 412 and/or a prioritization module 414 to protect transmissions of OIS information (e.g., information corresponding to a dedicated OIS control channel and/or OIS information embedded in data) conducted by a FLO radio 422 from respective transmissions from one or more colliding non-FLO radios 424 (e.g., LTE or the like). In one example, system 700 can expand on the operation of CxM 240 with respect to radios 422-424 by additionally enabling CxM 240 to prioritize transmissions of data and/or other non-OIS information made by FLO radio 422 over respective transmissions conducted by non-FLO radio(s) 424 in some cases.

In accordance with one aspect, CxM 240 in system 700 can achieve at least the above ends by utilizing a degradation measurement module 712, in addition to and/or in place of an OIS detector 412 and a prioritization module 414, to determine an extent of degradation currently experienced by non-FLO radio(s) 424. Degradation as measured by degradation measurement module 712 can be defined in terms of performance, signal or channel quality, and/or any other suitable metric. Based on measurements obtained from degradation measurement module 712, prioritization module 414 and/or any other suitable components of CxM 240 can dynamically modify the relative priorities of various transmissions conducted by FLO radio 422 and non-FLO radio(s) 424.

By of specific example, in addition to the OIS protection described above with respect to system 400, CxM 240 can initially prioritize respective data transmissions and/or other non-OIS transmissions conducted by FLO radio 422 above respective transmissions conducted by non-FLO radio(s) 424. This can be accomplished by disallowing, delaying, and/or otherwise de-prioritizing transmissions from a non-FLO radio 424 upon determining that such transmissions collide with a transmission from FLO radio 422. Further, CxM 240 can utilize degradation measurement module 712 and/or other suitable mechanisms to determine an extent to which the performance of non-FLO radio(s) 424 have degraded as a result of having lower priority than FLO transmissions. Upon determining that one or more non-FLO radios 424 have degraded by at least a predetermined threshold amount, prioritization module 414 can alter priorities associated with radios 422-424. For example, prioritization module 414 can switch priorities associated with radios 422-424 to allow transmissions from non-FLO radio(s) 424 over respective transmissions from FLO radio 422 upon detecting a threshold level of degradation to the non-FLO radio(s) 424. In one example, transmissions from non-FLO radio(s) 424 can be given priority over all FLO transmissions upon detecting a sufficient amount of degradation, or alternatively a subset of FLO transmission events (e.g., OIS transmissions) can remain at a higher level of priority than non-FLO transmissions irrespective of degradation.

In accordance with one aspect, degradation as measured by degradation measurement module 712 can be based on any suitable factors. By way of specific example, in an implementation involving a non-FLO radio 424 utilizing LTE, degradation of the LTE radio can be based upon a number of successive Physical Uplink Control Channel (PUCCH) transmissions and/or any other suitable periodic and/or non-periodic transmissions that are missed due to collisions with FLO radio 422 and/or any other suitable metric(s).

This example is further illustrated by diagram 800 in FIG. 8. As shown in diagram 800, the FLO OIS protection schemes described above can be extended to assign a higher priority to the data portion of transmissions from FLO radio 422 that collide with LTE PUCCH transmissions where the two technologies are unable to coexist. However, if two successive PUCCH transmission events are blocked to accommodate FLO data, then the priority of LTE events can be increased to a value higher than the priority of FLO data (and higher or lower than FLO OIS information). Thus, as shown in diagram 800, a lowest priority bin (Bin 1) can be associated with LTE PUCCH transmissions, a higher priority bin (Bin 2) can be associated with non-OIS FLO transmission events, a still higher priority bin (Bin 3) can be associated with LTE PUCCH transmissions upon two successive PUCCH misses, and a highest priority bin (Bin 4) can be associated with FLO OIS (e.g., TDM2OIS) events. Accordingly, upon two successive PUCCH misses, bin jumping can be performed for LTE PUCCH transmission events such that their relative priority is increased to more than that of FLO data transmission events. In one example, upon allowing a predetermined amount of LTE PUCCH events (e.g., 1) to go through, the priority of LTE events can fall back to the original value.

By implementing the bin jumping scheme described above and illustrated by diagram 800, it can be appreciated that FLO data can be protected to a greater extent than the protection given to FLO data in the protection scheme described above with respect to system 400 at the expense of a slightly higher PUCCH error rate. However, it can further be appreciated that the PUCCH error rate experienced with such a scheme will in some cases still be lower than that encountered in the case where FLO is always allowed to transmit in the event of a collision.

Figure 9:
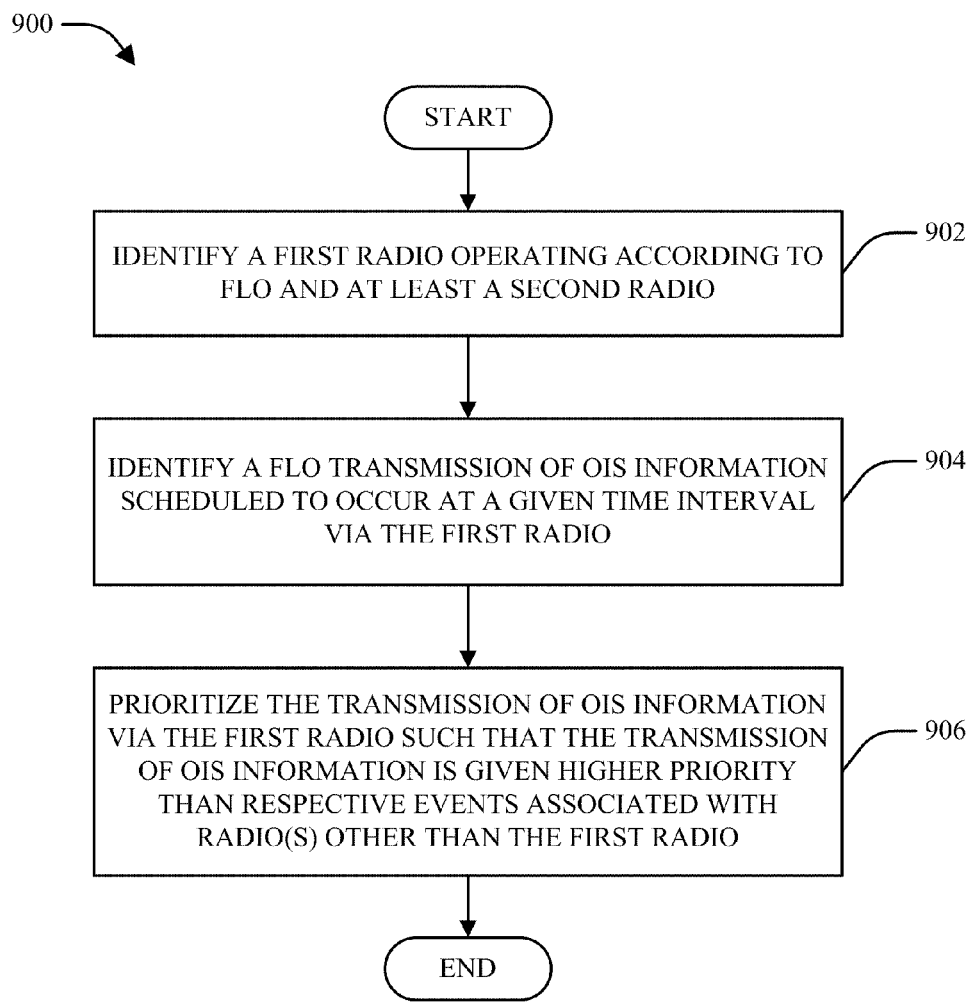
FIGS. 9-10 are flow diagrams of respective methodologies for performing multi-radio coexistence management in a wireless communication system.
Figure 10:
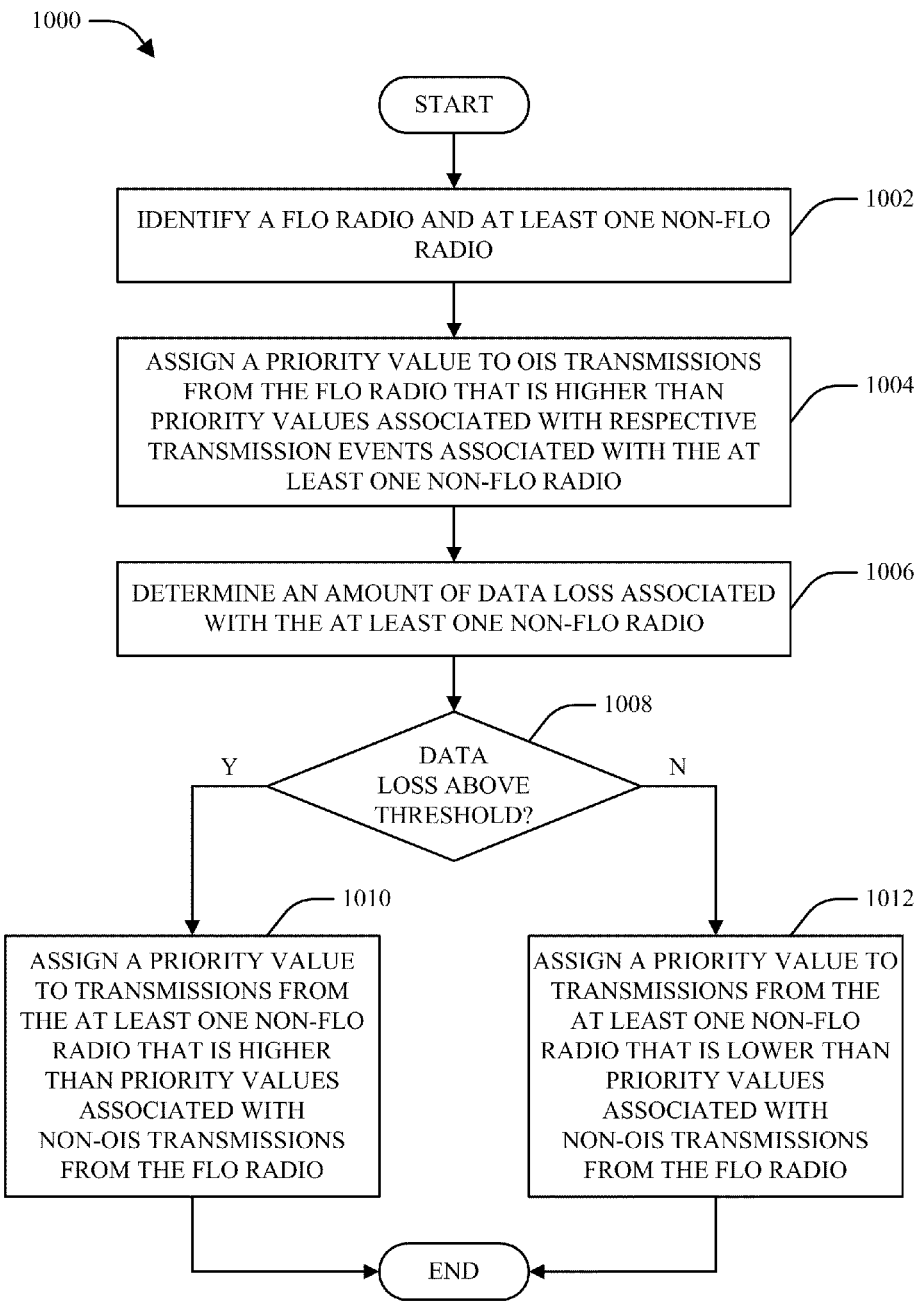

Referring now to FIGS. 9-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 9, illustrated is a methodology 900 for performing multi-radio coexistence management in a wireless communication system. It is to be appreciated that methodology 900 can be performed by, for example, a wireless device (e.g., wireless device 110 or 200, via a CxM 240) and/or any other appropriate network device. Methodology 900 can begin at block 902, wherein a first radio operating according to FLO (e.g., FLO radio 422) and at least a second radio (e.g., non-FLO radio(s) 424) are identified. At block 904, a FLO transmission of OIS information scheduled to occur at a given time interval via the first radio identified at block 902 is identified (e.g., by an OIS detector 412). Methodology 900 can then conclude at block 906, wherein the transmission of OIS information identified at block 904 is prioritized (e.g., by a prioritization module 414) such that the OIS transmission is given higher priority than respective events associated with radios other than the first radio. Thus, for example, non-OIS transmissions can be disallowed, delayed, and/or otherwise de-prioritized upon detecting a collision with an OIS transmission.

FIG. 10 illustrates another methodology 1000 for performing multi-radio coexistence management in a wireless communication system. Methodology 1000 can be performed by, for example, a wireless terminal and/or any other suitable network entity. Methodology 1000 begins at block 1002, wherein a FLO radio and at least one non-FLO radio are identified. Next, at block 1004, a priority value is assigned to OIS transmissions from the FLO radio identified at block 1002 that is higher than priority values associated with respective transmission events associated with the at least one non-FLO radio identified at block 1002.

Methodology 1000 can then proceed to block 1006, wherein an amount of data loss associated with the at least one non-FLO radio (e.g., corresponding to successive missed transmissions due to collisions with the FLO radio) is determined (e.g., by a degradation measurement module 712). At block 1008, it is then determined whether the data loss computed at block 1006 exceeds a predetermined threshold. If the amount of data loss exceeds the threshold, methodology 1000 can conclude at block 1010, wherein a priority value is assigned to transmissions from the at least one non-FLO radio identified at block 1002 that is higher than priority values associated with non-OIS transmissions from the FLO radio identified at block 1002. Otherwise, methodology 1000 can conclude at block 1012, wherein a priority value is assigned to transmissions from the at least one non-FLO radio identified at block 1002 that is lower than priority values associated with non-OIS transmissions from the FLO radio identified at block 1002.

In accordance with one aspect, OIS transmissions from the FLO radio can be configured by an entity performing methodology 1000 to have higher priority than all transmission events from non-FLO radios in all cases. Alternatively, non-FLO transmission events can be assigned a higher priority than OIS transmission events in some limited cases. Further, it should be appreciated that the determinations performed at blocks 1006 and 1008 can be performed on a general basis for all associated non-FLO radios, on a per-radio or per-radio group basis, and/or in any other suitable manner.

Figure 11:
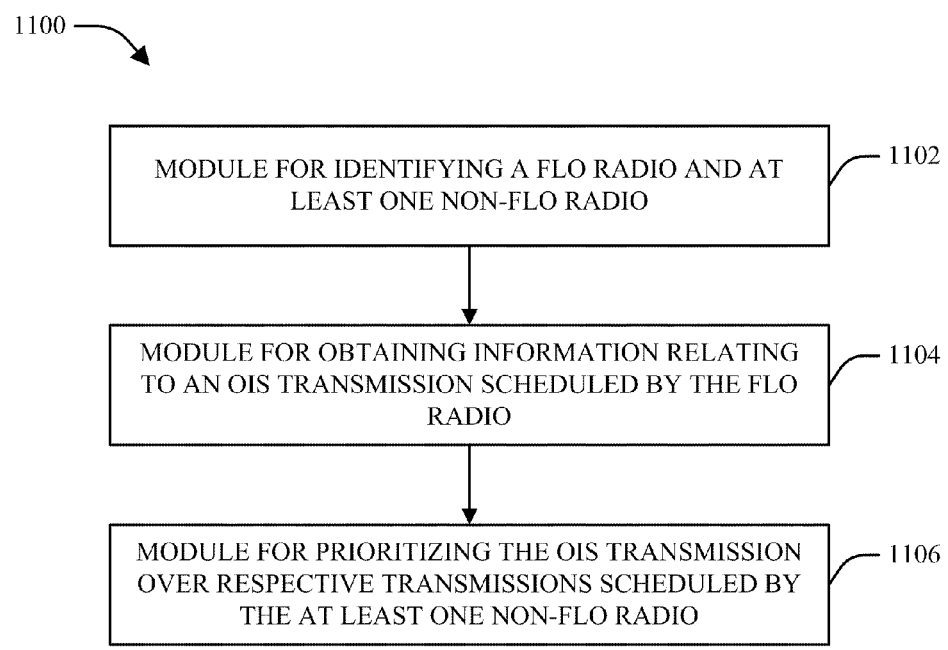
FIG. 11 is a block diagram of an apparatus that facilitates establishment of priorities for OIS transmissions and non-OIS transmissions associated with a multi-radio wireless device.

Turning to FIG. 11, an apparatus 1100 that facilitates establishment of priorities for OIS transmissions and non-OIS transmissions associated with a multi-radio wireless device is illustrated. It is to be appreciated that apparatus 1100 is represented as including functional blocks, which can be functional blocks that represent functions implemented by a processor, software, or combination thereof (e.g., firmware). Apparatus 1100 can be implemented by a wireless device (e.g., wireless device 110 or 200, via a CxM 240) and/or another suitable network entity and can include a module 1102 for identifying a FLO radio and at least one non-FLO radio, a module 1104 for obtaining information relating to an OIS transmission scheduled by the FLO radio, and a module 1106 for prioritizing the OIS transmission over respective transmissions scheduled by the at least one non-FLO radio.

Figure 12:
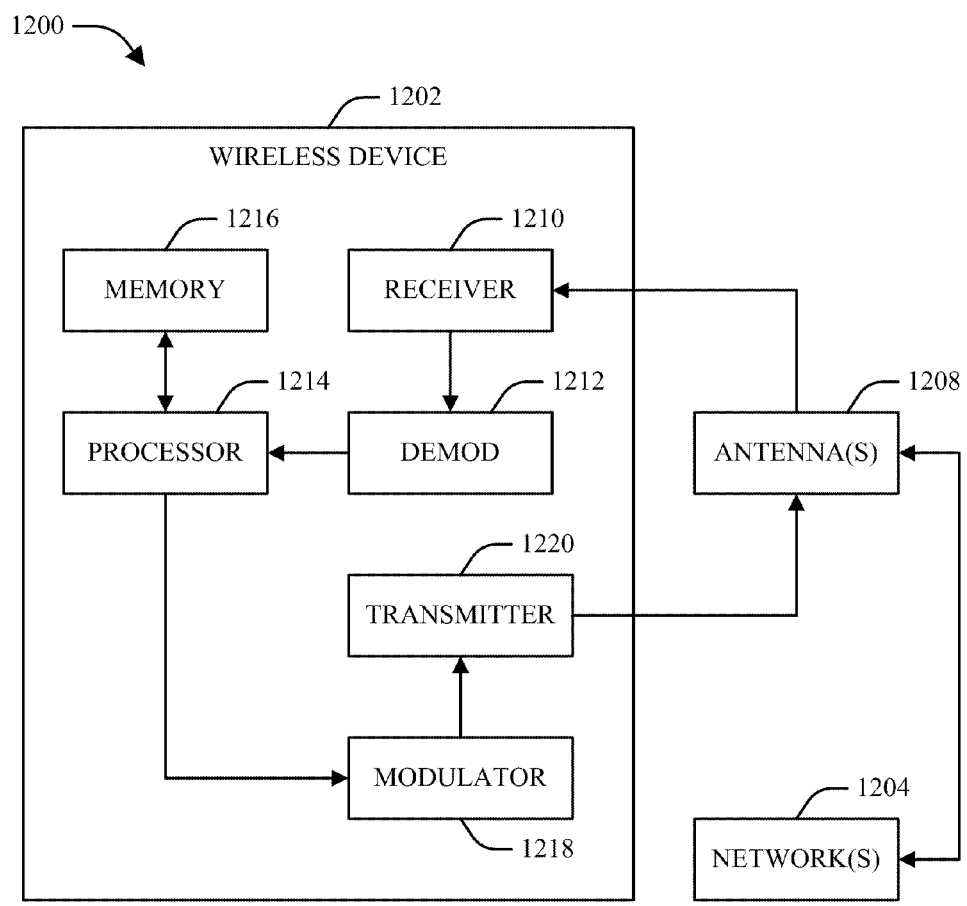
FIG. 12 is a block diagram of a wireless communications device that can be utilized to implement various aspects described herein.

FIG. 12 is a block diagram of a system 1200 that can be utilized to implement various aspects of the functionality described herein. In one example, system 1200 includes a wireless device 1202. As illustrated, wireless device 1202 can receive signal(s) from one or more networks 1204 and transmit to the one or more networks 1204 via one or more antennas 1208. Additionally, wireless device 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to terminal 1202. Additionally, wireless device 1202 can employ processor 1214 to perform methodologies 900-1000 and/or other similar and appropriate methodologies. Wireless device 1202 can also include a modulator 1218 that can multiplex a signal for transmission by a transmitter 1220 through antenna(s) 1208.

Figure 13:
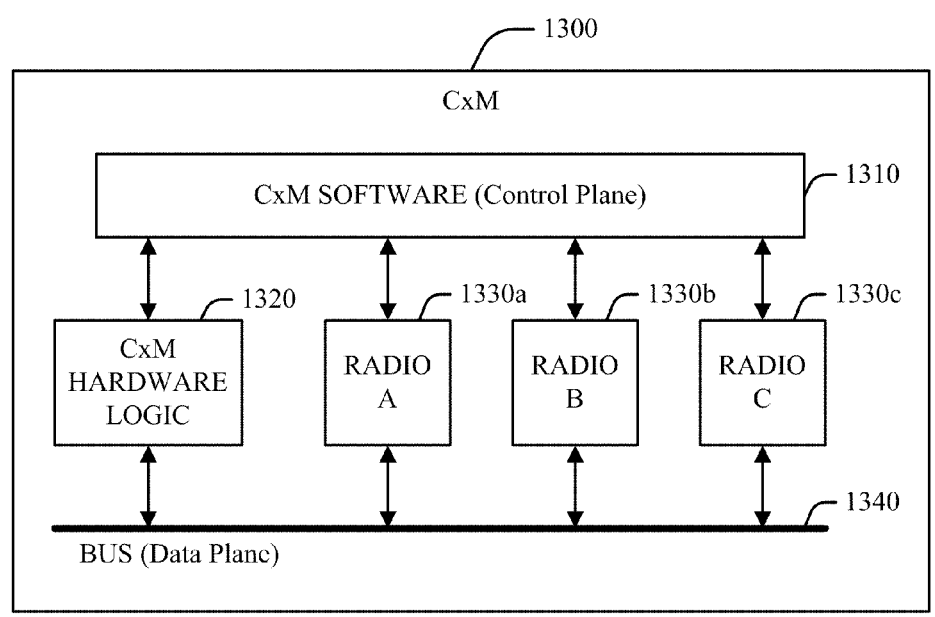
FIGS. 13-14 are block diagrams that illustrate respective aspects of an example coexistence manager that can be utilized to implement various aspects described herein.

Turning next to FIG. 13, an example implementation of a CxM 1300 that can be utilized to implement various aspects described herein is illustrated. In one example, if multiple radios that can potentially interfere with each other are utilized in a wireless communication system, CxM 1300 can be used to coordinate the respective radios. In one example, CxM 1300 can be implemented as a mixture of software and hardware by utilizing, for example, control plane CxM software 1310 and CxM hardware logic 1320.

In accordance with one aspect, CxM 1300 can be implemented as a centralized architecture such that respective radios 1330a-1330c can coordinate and/or send notifications to CxM hardware logic 1320, which can in turn send notifications back to respective radios 1330a-1330c. In another example, operation of CxM 1300 can be split into hardware and software to accommodate time scales associated with coexistence issues. For example, radios 1330a-1330c can provide notifications of an imminent radio event at a substantially fast time scale (e.g., on the order of 100-150 microseconds), and accordingly CxM hardware logic 1320 and/or a data plane bus 1340 between CxM hardware logic 1320 and radios 1330a-1330c can be utilized to accommodate expedient operation based on notifications. Additionally or alternatively, CxM software 1310 can be implemented in the control plane to facilitate operations that can occur on a slower time scale, such as coordination radios coming on or off, sleep mode operation, or the like.

Figure 14:
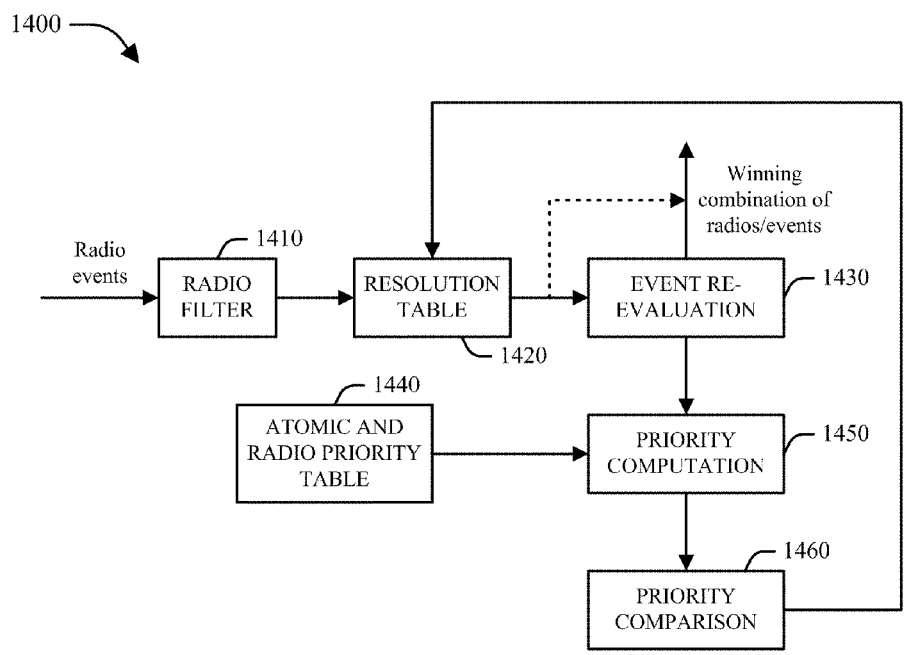

Diagram 1400 in FIG. 14 illustrates additional aspects of an example CxM implementation. As shown in diagram 1400, radio events can initially be processed by a radio filter 1410, which can identify groups or clusters of radios that can potentially interfere directly and/or indirectly. Next, a resolution table 1420 can be utilized to identify various parameters of the received events (e.g., transmit power, frequency subbands, receive power, tolerated interference, etc.) to determine whether the respective events can coexist.

Based on the operation of the resolution table 1420, an event re-evaluation block 1430 can then determine whether a highest priority (or "winning") combination of radios and/or events exists. If such a combination does not exist, priority computation block 1450 can determine relative priorities associated with events and/or groups of events. In one example, priority computation block 1450 can leverage an atomic and radio priority table 1440, which can be implemented as a table per radio carrying priorities of atomic events and another table carrying relative priorities across radios. In an example, both of such tables can be configured by CxM software and can be static over a given CxM software update.

Based on priorities obtained by priority computation block 1450, arbitration can be performed for various combinations of events via priority comparison block 1460. In accordance with one aspect, priority comparison block 1460 can select the highest priority combination of events and provide such information to resolution table 1420 for re-evaluation.

Figure 15:
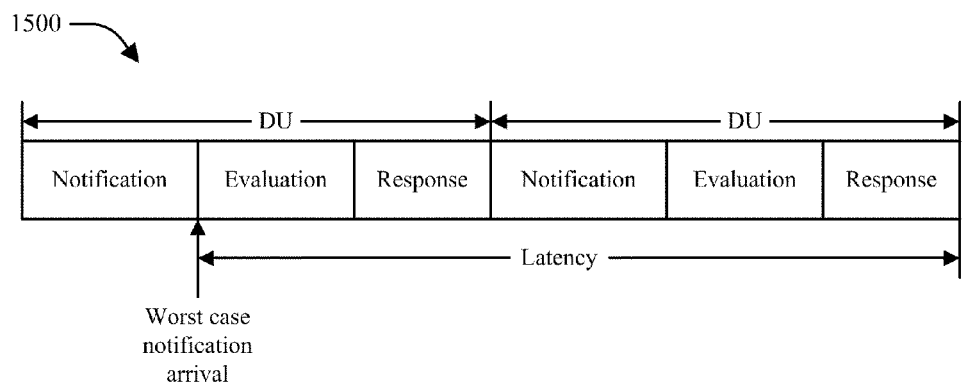
FIG. 15 illustrates operation of an example coexistence manager in time.

Turning to diagram 1500 in FIG. 15, an example timeline for CxM operation is illustrated. In one example, a CxM can operate according to a timeline divided into decision units (DUs) in time, which can be any suitable uniform or non-uniform length (e.g., 100 µs). By way of specific example, a DU can be divided into a notification phase (e.g., 50 µs) where various radios send notifications of imminent events, an evaluation phase (e.g., 30 µs) where notifications are processed, and a response phase (e.g., 20 µs) where commands are provided to various radios and/or other operations are performed based on actions taken in the evaluation phase. In one example, timeline 1500 can have a latency parameter defined by the worst case operation of timeline 1500, e.g., the timing of a response in the case that a notification is obtained from a given radio immediately following termination of the notification phase in a given DU.

With respect to the above description, one of ordinary skill in the art can appreciate that various aspects described above can be implemented by hardware, software, firmware, middleware, microcode, or any combination thereof. When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a first radio operating according to Forward Link Only (FLO) and at least one second radio not operating according to FLO;
    identifying a transmission of Overhead information Symbol (OIS) information scheduled to occur at a given time interval via the first radio; and
    prioritizing the transmission of OIS information such that the transmission of OIS information is given a higher priority level than respective events associated with the at least one second radio.

2. The method of claim 1, wherein the identifying a transmission of OIS information comprises identifying a transmission conducted by the first radio over a dedicated OIS control channel.

3. The method of claim wherein the identifying a transmission of OIS information comprises identifying a data transmission by the first radio that contains embedded OIS information.

4. The method of claim 1, further comprising prioritizing respective events associated with the at least one second radio such that the respective events associated with the at least one second radio are given a higher priority level than respective events associated with the first radio that are not related to OIS transmission.

5. The method of claim 1, wherein the prioritizing comprises assigning the transmission of OIS information a higher priority level than that assigned to respective events associated with the at least one second radio upon determining that transmit powers of respective events associated with the at least one second radio that overlap with the transmission of OIS information would cause the transmission of OIS information to miss a predetermined signal quality requirement.

6. The method of claim 5, wherein the prioritizing further comprises performing at least one of disallowing or delaying the respective events associated with the at least one second radio that overlap with the transmission of OIS information.

7. The method of claim 1, further comprising:
identifying an extent of degradation experienced by a second radio; and
prioritizing respective transmissions of information disparate from OIS information conducted by the first radio relative to respective events associated with the second radio based on the extent of degradation experienced by the second radio.

8. The method of claim 7, wherein the prioritizing respective transmissions of information disparate from OIS information conducted by the first radio comprises:
comparing the extent of degradation experienced by the second radio to a predefined threshold; and
assigning a priority value to events associated with the second radio that is higher than priority values associated with the respective transmissions of information disparate from OIS information conducted by the first radio upon determining that the extent of degradation experienced by the second radio is greater than the predefined threshold.

9. The method of claim 7, wherein the prioritizing respective transmissions of information disparate from OIS information conducted by the first radio comprises:
comparing the extent of degradation experienced by the second radio to a predefined threshold; and
assigning a priority value to events associated with the second radio that is lower than priority values associated with the respective transmissions of information disparate from OIS information conducted by the first radio upon determining that the extent of degradation experienced by the second radio is less than the predefined threshold.

10. The method of claim 7, wherein the second radio operates according to Long Term Evolution (LTE).

11. The method of claim 10, wherein the identifying an extent of degradation comprises identifying a number of successive Physical Uplink Control Channel (PUCCH) transmissions that have been missed by the second radio.

12. The method of claim 10, wherein the prioritizing respective transmissions of information disparate from OIS information conducted by the first radio comprises:
identifying a PUCCH transmission event associated with the second radio;
assigning, a priority value to the PUCCH transmission event that is lower than priority values associated with the respective transmissions of information disparate from OIS information conducted by the first radio upon determining that less than two successive PUCCH transmissions have been missed by the second radio preceding the PUCCH transmission event; and
assigning a priority value to the PUCCH transmission event that is higher than priority values associated with the respective transmissions of information disparate from OIS information conducted by the first radio upon determining that at least two successive PUCCH transmissions have been missed by the second radio preceding the PUCCH transmission event.

13. The method of claim 12, further comprising disallowing the PUCCH transmission event upon determining that less than two successive PUCCH transmissions have been missed by the second radio preceding the PUCCH transmission event.

14. The method of claim 1, wherein at least one second radio is an LTE radio.

15. The method of claim 14, wherein the prioritizing comprises assigning the transmission of OIS information a higher priority level than that assigned to respective PUCCH transmissions associated with the LTE radio.

16. A wireless communications apparatus, comprising:
a memory that stores data relating to a first radio operating according to Forward Link Only (FLO), at least one second radio not operating according to FLO, and a transmission of Overhead Information Symbol (OIS) information scheduled by the first radio; and
a processor configured to prioritize the transmission of OIS information such that the transmission of OIS information is given a higher priority level than respective events associated with the at least one second radio.

17. The wireless communications apparatus of claim 16, wherein the transmission of OIS information comprises a transmission conducted by the first radio over a dedicated OIS control channel.

18. The wireless communications apparatus of claim 16, wherein the transmission of OIS information comprises a data transmission by the first radio that contains embedded OIS information.

19. The wireless communications apparatus of claim 16, wherein the processor is further configured to assign respective events associated with the at least one second radio a higher priority level than priority levels assigned to respective events associated with the first radio that are not related to OIS transmission.

20. The wireless communications apparatus of claim 16, wherein the processor is further configured to assign a higher priority level to the transmission of OIS information than priority levels assigned to respective events associated with the at least one second radio upon determining that transmit powers of respective events associated with the at least one second radio that overlap with the transmission of OIS information would cause the transmission of OIS information to miss a predetermined signal quality requirement.

21. The wireless communications apparatus of claim 20, wherein the processor is further configured to disallow or delay the respective events associated with the at least one second radio that overlap with the transmission of OIS information.

22. The wireless communications apparatus of claim 16, wherein the processor is further configured to identify an amount of degradation associated with a second radio and to prioritize respective data transmissions conducted by the first radio relative to respective events associated with the second radio based on the amount of degradation associated with the second radio.

23. The wireless communications apparatus of claim 22, wherein the processor is further configured to compare the amount of degradation associated with the second radio to a predefined threshold and to assign priority values to events associated with the second radio that are higher than priority values associated with the respective data transmissions conducted by the first radio upon determining that the amount of degradation associated with the second radio is greater than the predefined threshold.

24. The wireless communications apparatus of claim 22, wherein the processor is further configured to compare the amount of degradation associated with the second radio to a predefined threshold and to assign priority values to events associated with the second radio that are lower than priority values associated with the respective data transmissions conducted by the first radio upon determining that the amount of degradation associated with the second radio is less than the predefined threshold.

25. The wireless communications apparatus of claim 22, wherein the second radio operates according to Long Term Evolution (LTE).

26. The wireless communications apparatus of claim 25, wherein the processor is further configured to identify the amount of degradation associated with the second radio based on a number of successive Physical Uplink Control Channel (PUCCH) transmissions that have been missed by the second radio.

27. The wireless communications apparatus of claim 25, wherein the processor is further configured to identify a PUCCH transmission event associated with the second radio, to assign a priority value to the PUCCH transmission event that is lower than priority values associated with the respective data transmissions conducted by the first radio upon determining that less than two successive PUCCH transmissions have been missed by the second radio preceding the PUCCH transmission event, and to assign a priority value to the PUCCH transmission event that is higher than priority values associated with the respective data transmissions conducted by the first radio upon determining that at least two successive PUCCH transmissions have been missed by the second radio preceding the PUCCH transmission event.

28. The wireless communications apparatus of claim 27, wherein the processor is further configured to disallow the PUCCH transmission event upon determining that less than two successive PUCCH transmissions have been missed by the second radio preceding the PUCCH transmission event.

29. The wireless communications apparatus of claim 16, wherein at least one second radio operates according to LTE.

30. The wireless communications apparatus of claim 29, wherein the processor is farther configured to assign a higher priority level to the transmission of OIS information than priority levels assigned to respective PUCCH transmissions associated with at least one second radio operating according to LTE.

31. An apparatus, comprising:
means for identifying a Forward Link Only (FLO) radio and at least one non-FLO radio;
means for obtaining information relating to an Overhead Information Symbol (OIS) transmission scheduled by the FLO radio; and
means for prioritizing the OIS transmission over respective transmissions scheduled by the at least one non-FLO radio.

32. The apparatus of claim 31, wherein the OIS transmission is conducted by the FLO radio over a dedicated OIS control channel.

33. The apparatus of claim 31, wherein the OIS transmission comprises a data transmission conducted by the first radio that contains embedded OIS information.

34. The apparatus of claim 31, further comprising means for prioritizing respective events associated with the at least one non-FLO radio over respective non OIS transmissions conducted by the FLO radio.

35. The apparatus of claim 31, wherein the means for prioritizing comprises means for prioritizing an OIS transmission scheduled by the FLO radio over respective transmissions scheduled by the non-FLO radio that overlap with the OIS transmission and would cause the OIS transmission to miss a predetermined signal quality requirement.

36. The apparatus of claim 35, wherein the means for prioritizing further comprises means for disallowing or delaying respective transmissions scheduled by the non-FLO radio that overlap with the OIS transmission and would cause the OIS transmission to miss a predetermined signal quality requirement.

37. The apparatus of claim 31, further comprising:
means for measuring performance loss associated with a selected non-FLO radio; and
means for prioritizing respective non-GIS transmissions scheduled by the FLO radio relative to respective transmissions scheduled by the selected non-FLO radio based on the performance loss associated with the selected non-FLO radio.

38. The apparatus of claim 37, Wherein the means for prioritizing respective non-OIS transmissions comprises:
means for comparing the performance loss associated with the selected non-FLO radio to a threshold; and
means for prioritizing one or more transmissions scheduled by the selected non-FLO radio over respective non-OIS transmissions scheduled by the FLO radio upon determining that the performance loss associated with the selected non-FLO radio is greater than the threshold.

39. The apparatus of claim 37, wherein the means for prioritizing respective non-OIS transmissions comprises:
means for comparing the performance loss associated with the selected non-FLO radio to a threshold; and
means for prioritizing one or more non-OIS transmissions scheduled by the FLO radio over respective transmissions scheduled by the selected non-FLO radio upon determining that the performance loss associated with the selected non-FLO radio is less than the threshold.

40. The apparatus of claim 37, wherein the selected non-FLO radio is a Long Term Evolution (LTE) radio.

41. The apparatus of claim 40, wherein the means for measuring comprises means for identifying a number of successive Physical Uplink Control Channel (PUCCH) transmissions that have been missed by the LTE radio.

42. The apparatus of claim 40, wherein the means for prioritizing respective non-OIS transmissions comprises:
means for identifying a PUCCH transmission scheduled by the LTE radio;
means for prioritizing one or more non-OIS transmissions scheduled by the FLO radio over the PUCCH transmission upon identifying that less than two successive PUCCH transmissions have been missed by the LTE radio preceding the identified PUCCH transmission; and
means for prioritizing the PUCCH transmission over respective non-OIS transmissions scheduled by the FLO radio upon determining that at least two successive PUCCH transmissions have been missed by the LTE radio preceding the identified PUCCH transmission.

43. The apparatus of claim 42, further comprising means for disallowing the identified PUCCH transmission upon identifying that less than two successive PUCCH transmissions have been missed by the LTE radio preceding the identified PUCCH transmission.

44. The apparatus of claim 31, wherein at least one non-FLO radio is a LTE radio.

45. The apparatus of claim 44, wherein the means for prioritizing comprises means for prioritizing the OIS transmission over respective PUCCH transmissions scheduled by the LTE radio.

46. A computer program product, comprising:
a non-transitory computer-readable medium, comprising:
- code for causing a computer to identify a first radio operating according to Forward Link Only (FLO) and at least one second radio not operating according to FLO;
- code for causing a computer to identify a transmission of Overhead Information Symbol (OIS) information scheduled by the first radio; and
- code for causing a computer to prioritize the transmission of OIS information such that the transmission of OIS information is given a higher priority level than respective events associated with the at least one second radio.

* * * * *